US008752523B2

(12) United States Patent
Foege (10) Patent No.: US 8,752,523 B2
(45) Date of Patent: Jun. 17, 2014

(54) PISTON ASSEMBLY HAVING OFFSET BEARING

(75) Inventor: Aaron G. Foege, Westmont, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 0 days.

(21) Appl. No.: 13/459,586

(22) Filed: Apr. 30, 2012

(65) Prior Publication Data

US 2013/0284142 A1    Oct. 31, 2013

(51) Int. Cl.
*F16C 9/04* (2006.01)
(52) U.S. Cl.
USPC .......................................... 123/197.3; 74/594
(58) Field of Classification Search
USPC ............... 123/197.1, 197.3, 197.4, 196 R; 74/579 R, 580, 583, 594
See application file for complete search history.

(56) References Cited

U.S. PATENT DOCUMENTS

| 2,661,253 | A | * | 12/1953 | Barlow et al. | 384/155 |
|---|---|---|---|---|---|
| 3,241,896 | A | * | 3/1966 | Pinkerton | 384/294 |
| 4,231,623 | A | * | 11/1980 | Kaufman | 384/429 |
| 4,668,107 | A | * | 5/1987 | Showalter | 384/114 |
| 5,172,983 | A | * | 12/1992 | Landrum | 384/294 |
| 5,765,451 | A | * | 6/1998 | Carone | 74/597 |
| 6,178,932 | B1 | | 1/2001 | Matsuda et al. | |
| 6,412,453 | B1 | * | 7/2002 | Rao et al. | 123/48 B |
| 8,220,434 | B2 | * | 7/2012 | Mouradov | 123/197.3 |
| 8,376,620 | B2 | * | 2/2013 | Yamazaki et al. | 384/288 |
| 2009/0297079 | A1 | * | 12/2009 | Becker et al. | 384/250 |

FOREIGN PATENT DOCUMENTS

| KR | 2019980024270 | 7/1998 |
|---|---|---|
| KR | 1020000046025 | 7/2000 |

OTHER PUBLICATIONS

G. Ciliberto & L. Mariani, "Evolution Du Coussinet de Tete a Crosse Dans les Moteurs A 2 Temps," 12th International Congress on Combustion Engines, 1977, pp. 1-29, Tokyo.
G. Ciliberto & L. Mariani, "Evolution of a Head Bearing in Stock 2-Stroke Engines," 12th International Congress on Combustion Engines, 1977, pp. 1-29, Tokyo.
G. Celli, "Einige Merkmale des GMT-Zweitaktdieselmotors B 600 mit kleiner Bohrung," MTZ Motortechnische Zeitschrift 39 (1978) 2. pp. 57-60.
G. Celli, "Some Features of the GMT Two-Stroke Diesel Engine with a Small Hole B 600," MTZ Motortechnische Zeitschrift 39 (1978) 2. pp. 57-60.

(Continued)

*Primary Examiner* — Noah Kamen
*Assistant Examiner* — Grant Moubry
(74) *Attorney, Agent, or Firm* — Finnegan, Henderson, Farabow, Garrett & Dunner LLP (57) ABSTRACT

A piston assembly is disclosed for use with an engine. The piston assembly may include a first and second piston crown and a first and second connecting rod. The first and second connecting rods may each have a first end pivotally connected to the first and second piston crowns, respectively, and a second end with a circular opening configured to receive a throw of a crankshaft. The second connecting rod may have a running surface defining at least two outer lands and at least one inner land disposed between the at least two outer lands that alternately support a load of the second piston crown. The piston assembly may further include a bearing. Both the inner and outer lands may simultaneously support the load of the second piston crown against the bearing at a point of highest load on the second piston crown.

18 Claims, 6 Drawing Sheets

(56) References Cited

OTHER PUBLICATIONS

J.F. Booker & P. Olikara, "Dynamics of Offset Beatings: Parametric Studies," Journal of Tribology, Jul. 1984, pp. 352-358, vol. 106.

S. Boedo & J.F. Booker, "Dynamics of Offset Journal Bearings—Revisited," Proc. IMechE, vol. 223 Part J: J. Engineering Tribology, 2009, pp. 359-369.

Boedo., S. et al., "Dynamics of Offset Journal Bearings Revisited" IMechE Jan. 2009 vol. 223, Part J.

* cited by examiner

PISTON ASSEMBLY HAVING OFFSET BEARING

TECHNICAL FIELD

The present disclosure relates generally to a piston assembly and, more particularly, to a piston assembly having an offset connecting rod bearing.

BACKGROUND

Internal combustion engines convert chemical energy in fuel into mechanical energy through a series of explosions within a combustion chamber of the engine. These explosions cause pistons of the engine to reciprocate within enclosed spaces called cylinders. Each piston is typically connected to a crankshaft by a connecting rod, such that movement of the piston results in rotation of the crankshaft. A bearing is disposed between an end of the connecting rod and the crankshaft. In some applications, multiple connecting rods connect to the crankshaft via a single bearing.

During engine operation, each connecting rod experiences tremendous stress under the load of the corresponding piston as force from the explosion is mechanically transferred to the crankshaft. Generally, this stress intensifies with higher engine speeds and engine firing pressures. Under such tremendous stress, an insufficient lubrication between the connecting rod and its associated bearing can result in elevated friction and wear. The elevated friction and wear can reduce the durability, reliability, and efficiency of the engine.

One attempt to improve lubrication in a common bearing/multi-rod application is described in "Dynamics of Offset Journal Bearings—Revisited" by S. Boedo and J. F. Booker that published in 2009. In particular, Boedo and Booker describes applications of offset journal bearing designs for diesel engines that improve lubrication between a connecting rod and its associated bearing. Offset journal bearing designs traditionally involve offsetting journal segments within a bearing. In such arrangements, the primary support of the rod load alternates between the segments. Load sharing between segments facilitates lubrication by periodically relieving the load carried by each segment, which helps to maintain a hydrodynamic lubrication in the segments. Boedo and Booker also describes grooved bearing surfaces that enhance lubrication.

Although the offset bearing of Boedo and Booker may enhance lubrication between connecting rods and their associated bearing, it may be less than optimal. This is because the angular arrangement of the segments of Boedo and Booker does not correspond with the highest loads generated by the associated pistons. As a result, a sufficient oil film may not be generated at the appropriate time during movement and loading of the pistons. Further, while grooved bearings may generally facilitate lubrication distribution, such grooves can also limit a load bearing area available on the bearing. This reduction in load bearing area may reduce the maximum load that can be transmitted through the bearing.

The piston assembly of the present disclosure solves one or more of the problems set forth above and/or other problems in the art.

SUMMARY

In one aspect, the present disclosure is related to a piston assembly. The piston assembly may include a first piston crown, and a first connecting rod having a first end pivotally connected to the first piston crown and a second end with a circular opening configured to receive a throw of a crankshaft. The piston assembly may also include a second piston crown, and a second connecting rod having a first end pivotally connected to the second piston crown and a second end with a circular opening configured to receive the throw of the crankshaft. The second connecting rod may have a running surface defining at least two outer lands and at least one inner land disposed between the at least two outer lands that alternately support a load of the second piston crown. The engine may further include a bearing disposed within the circular openings of the first and second connecting rods between the second ends of the first and second connecting rods and the throw of the crankshaft. Both the inner and outer lands may simultaneously support the load of the second piston crown against the bearing at a point of highest load on the second piston crown.

In another aspect, the present disclosure may be related to an engine. The engine may include an engine block at least partially defining a plurality of cylinders, and a crankshaft rotatably disposed within the engine block. The engine may further include a first piston crown disposed within a first of the plurality of cylinders, and a first connecting rod having a first end pivotally connected to the first piston crown and a second end with as circular opening configured to receive a throw of the crankshaft. The engine may also include a second piston crown disposed within a second of the plurality of cylinders, and a second connecting rod having a first end pivotally connected to the second piston crown and a second end with a circular opening configured to receive the throw of the crankshaft. The second connecting rod may have a running surface defining at least two outer lands and at least one inner land disposed between the at least two outer lands that alternately support a load of the second piston crown. The piston assembly may further include a bearing disposed within the circular openings of the first and second connecting rods between the second ends of the first and second connecting rods and the throw of the crankshaft. Both the inner and outer lands may simultaneously support the load of the second piston crown against the bearing at a point of highest load on the second piston crown.

DETAILED DESCRIPTION

Figure 1:
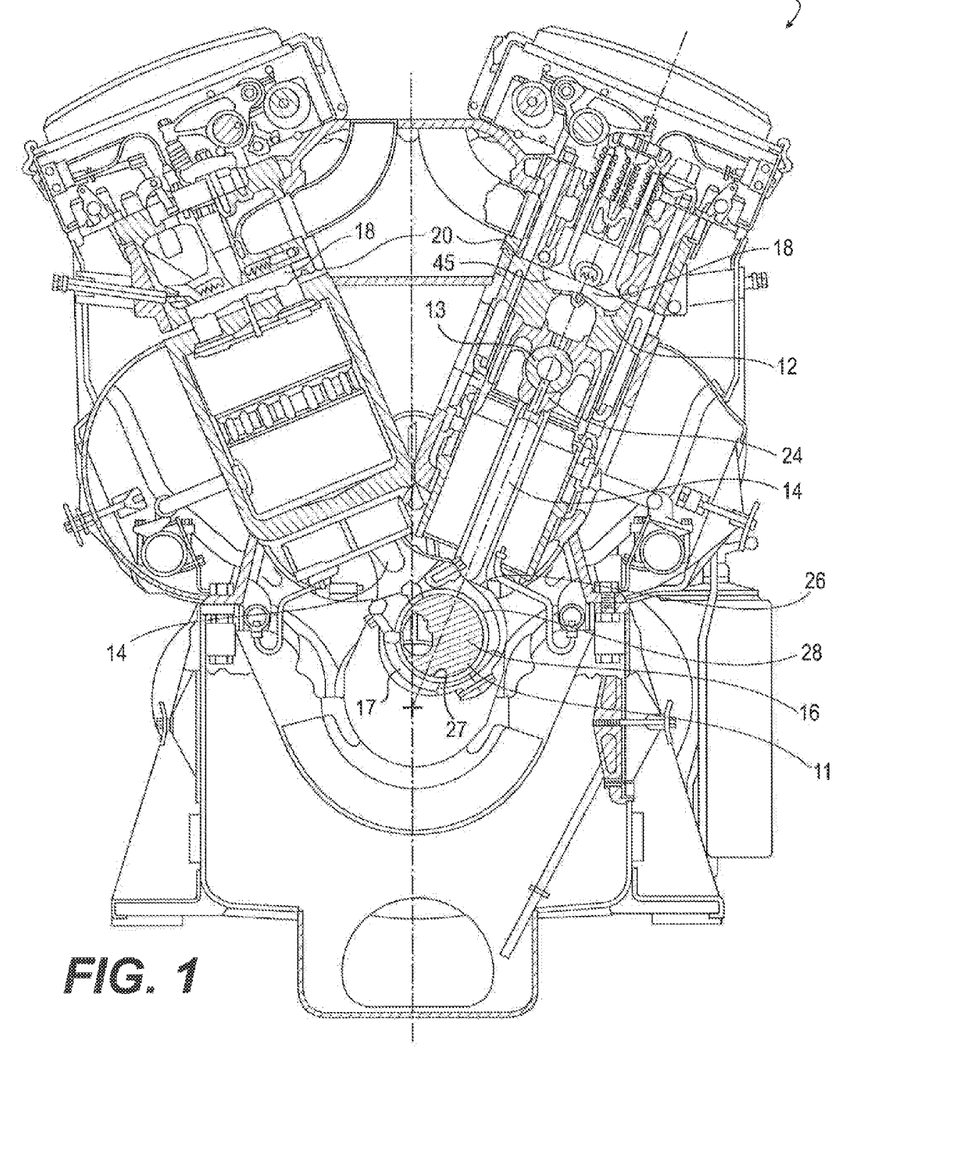
FIG. 1 is a cross-sectional illustration of an exemplary disclosed engine.

FIG. 1 illustrates an exemplary embodiment of an engine 10 that may be, for example, a diesel engine, a gasoline engine, or a gaseous fuel-powered engine. Engine 10, in this embodiment, is a two-cycle diesel engine of a locomotive. Engine 10 may include, among other things, an assembly of pistons 12, connecting rods 14, and a crankshaft 16. These components may operate together to transform chemical energy in fuel into useful rotational motion of crankshaft 16 through a series of explosions within combustion chambers 18 of engine 10. These explosions may cause pistons 12 and connecting rods 14 of engine 10 to reciprocate within cylinders 20.

Each piston 12 may be connected to crankshaft 16 by a corresponding one of connecting rods 14, such that movement of piston 12 results in rotation of crankshaft 16. Connecting rods 14 may include a first end 24 having a piston pin bore 13 and a second end 26 having a crank bore 27. Piston pin bore 13 may receive a piston pin that pivotally connects each connecting rod 14 to a corresponding piston 12 at a crown 45 of piston 12. Crank bore 27 may receive a throw 11 that pivotally connects each connecting rod 14 to crankshaft 16. During operation of engine 10, connecting rods 14 may move in a tilted reciprocating motion, which may generally be defined by the linear movement of first end 24 and the rotational movement of second end 26.

Figure 2:
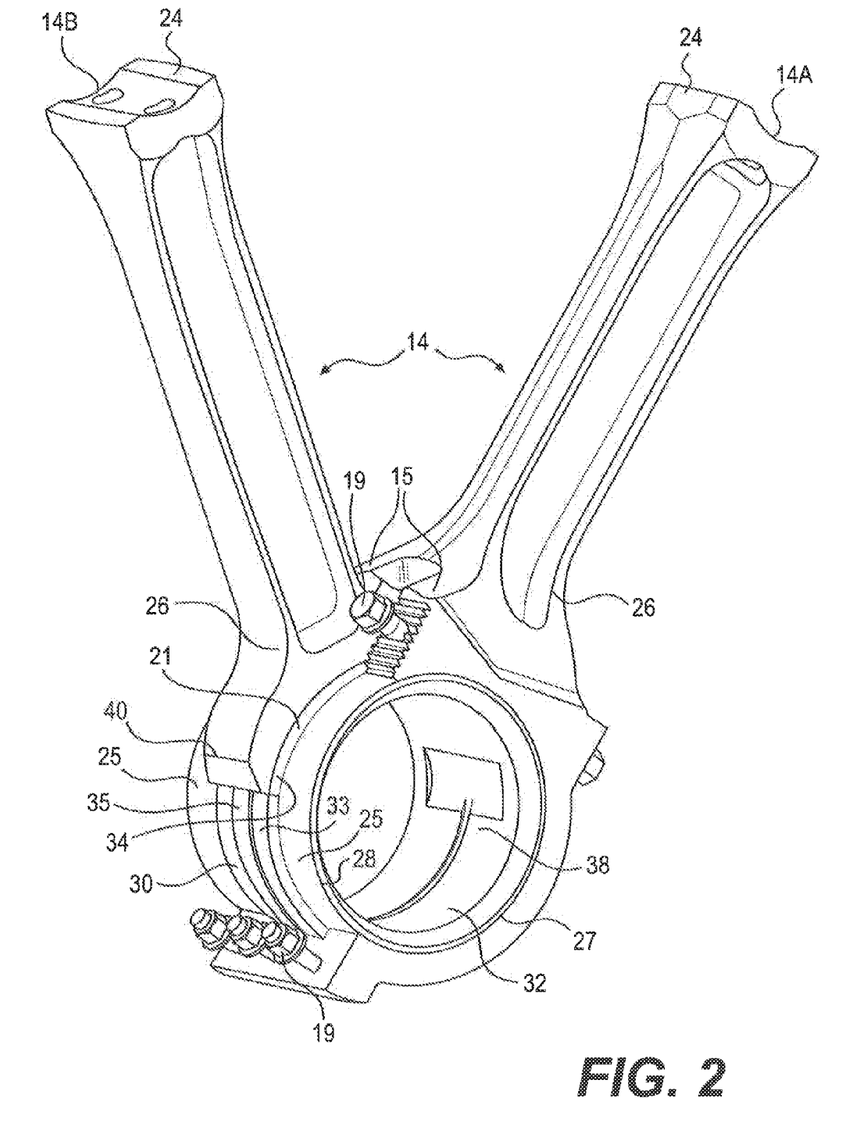
FIG. 2 is a perspective view illustration of exemplary disclosed connecting rods that may be used in conjunction with the engine of FIG. 1.

FIG. 2 illustrates a perspective view of an exemplary embodiment of connecting rods 14. Connecting rods 14 may be arranged in pairs, involving a fork rod 14*a* and a blade rod 14*b*. Each pair of connecting rods 14 may share a common bearing 28. Bearing 28 may rotate on throw 11 (referring to FIG. 1) of crankshaft 16. Bearing 28 is described in greater detail below. Blade rod 14*b* may be disposed within tines 15 of fork rod 14*a*.

Figure 4:
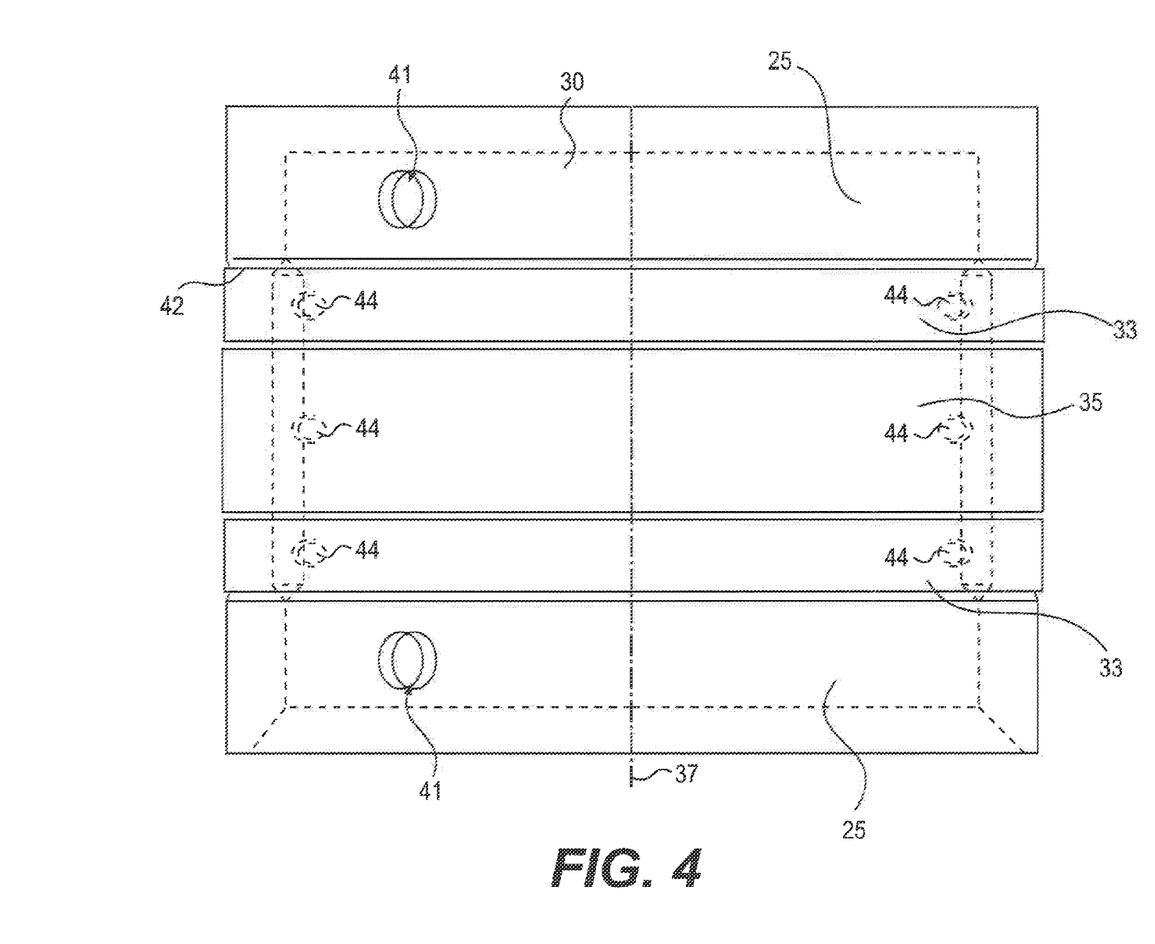
FIG. 4 is a top view illustration of an exemplary disclosed bearing that may be used in conjunction with the connecting rods of FIG. 2.

Fork rod 14*a* may be permanently connected to bearing 28 via a series of dowel pins (not shown; recess 41 that receives the dowel pins is shown in FIG. 4), a cap 17 (shown only in FIG. 1 and removed from FIG. 2 for clarity), and one or more fasteners 19. This arrangement may inhibit movement of fork rod 14*a* relative to bearing 28, while permitting fork rod 14*a* to rotate with bearing 28 about throw 11. Because fork rod 14*a* may not rotate relative to bearing 28, fork rod 14*a* may not require lubrication between its second end 26 and bearing 28.

Figure 3:
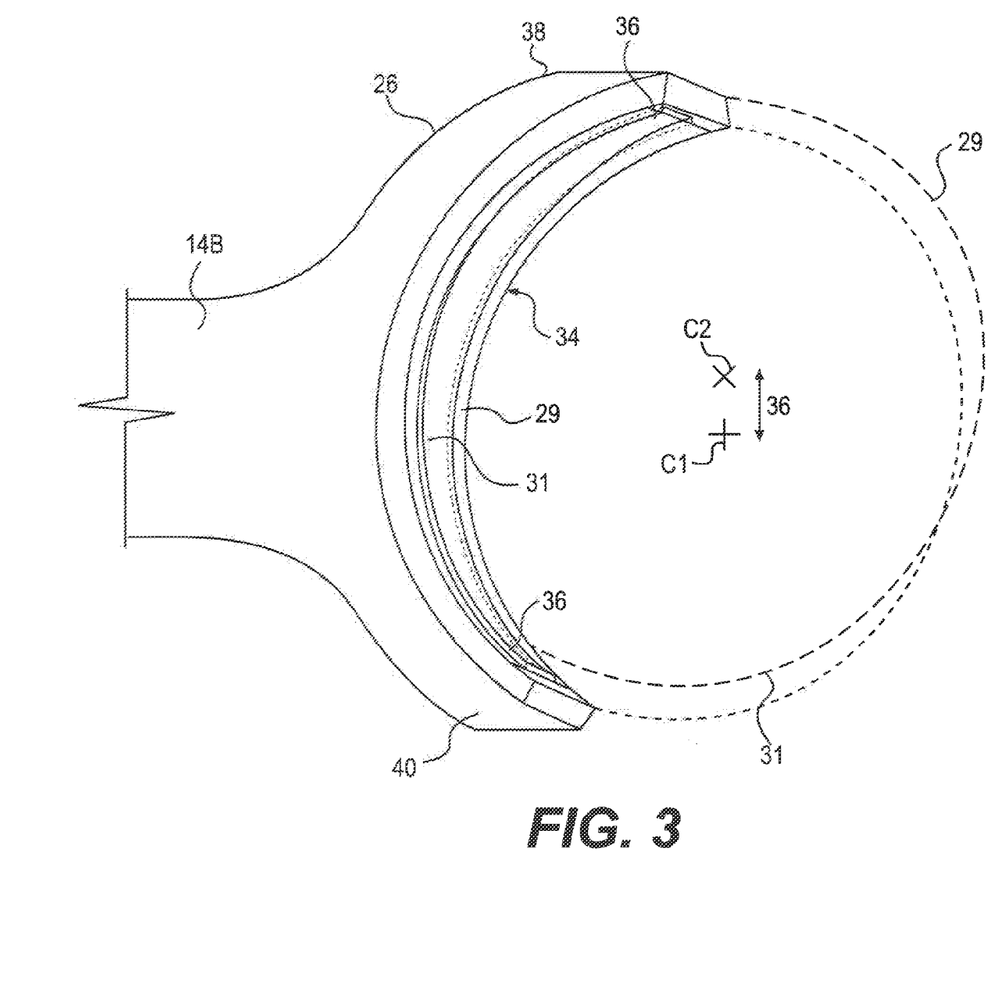
FIG. 3 is an enlarged side view illustration of an end of a connecting rod of FIG. 2.

As also shown in FIG. 2, second end 26 of blade rod 14*b* may include a blade 21 inter-leaved with tines 15 of fork rod 14*a*. Second end 26 of blade rod 14*b* may include a running surface 34 that abuts an outer surface 30 of bearing 28. As shown in FIG. 3, blade rod 14*b* may include a long toe 38 and a short toe 40 oriented opposite long toe 38. Blade rod 14*b* may oscillate around bearing 28 within tines 15 of fork rod 14*a*.

As shown in FIG. 3, running surface 34 of second end 26 of blade rod 14*b* may include two substantially identical and spaced apart outer lands 29 and one inner land 31 disposed between outer lands 29. Outer and inner lands 29, 31 may have generally cylindrical shapes, although barrel shapes may also be utilized, if desired. Inner land 31 may have a width greater than approximately 50% of the width of running surface 34. Outer lands 29 may each have a width ranging between approximately 25-50% of the width of inner land 31. Outer and inner lands 29, 31 may each have substantially identical curvatures of radius.

A centerline of radius —$C_1$— of outer lands 29 may be radially offset from a centerline of radius —$C_2$— of inner land 31, such that a radial offset 36 (e.g., a step) may be created between inner land 31 and outer lands 29. In particular, inner land 31 may be shifted towards long toe 38 and outer lands 29 may be shifted towards short toe 40. In another embodiment (not shown), offset 36 may be created by shifting inner land 31 towards short toe 40 and shifting outer lands 29 towards long toe 38, if desired. Offset 36 may range between approximately 0.010-0.030 inches.

Figure 5:
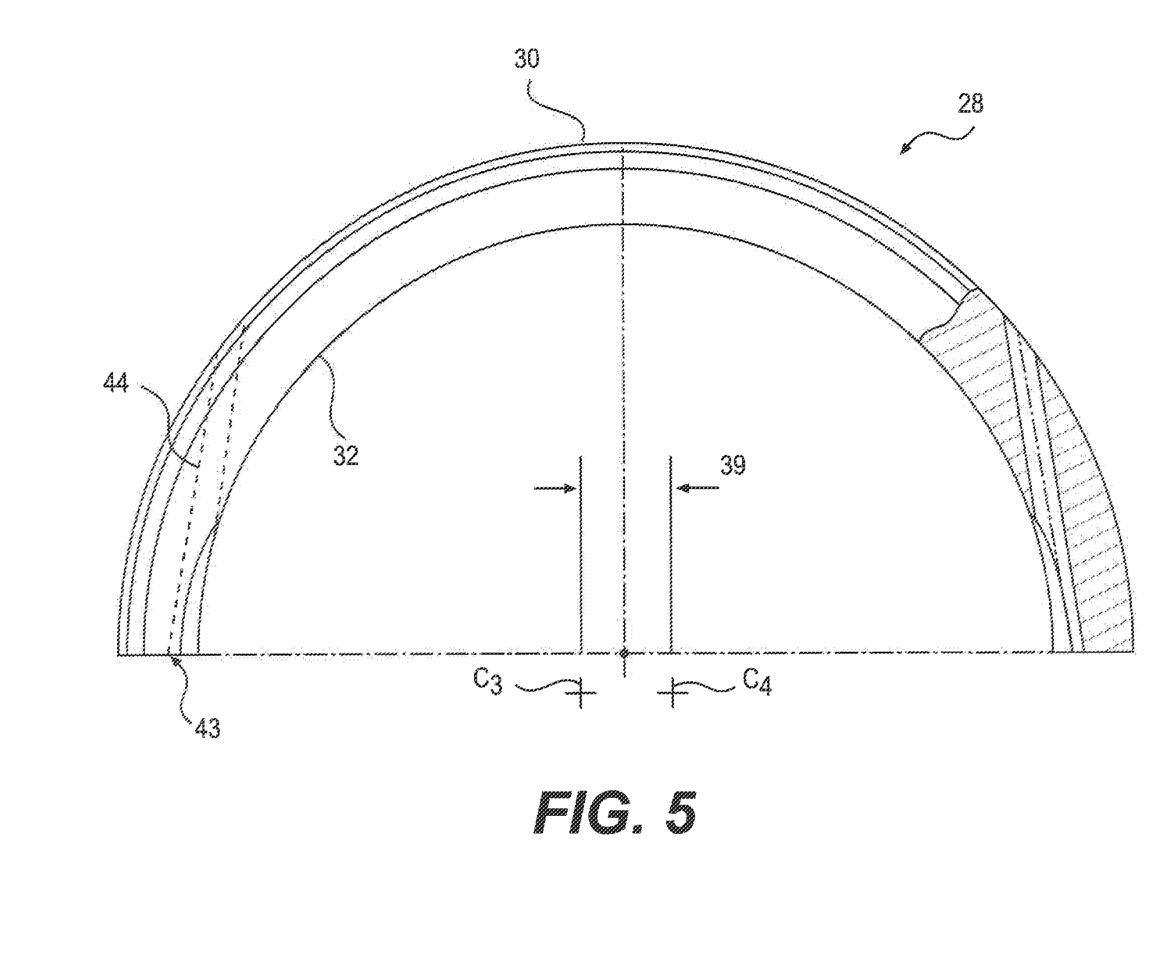
FIG. 5 is a cross-sectional illustration of the bearing of FIG. 4.

FIGS. 2, 4, and 5 illustrate features of bearing 28 that may be used in conjunction with connecting rods 14. Bearing 28 may include outer surface 30 and an opposing inner surface 32. Bearing 28 may be disposed within crank bore 27 of connecting rods 14, between the second ends 26 of connecting rods 14 and throw 11 of crankshaft 16 (referring to FIG. 1). Inner surface 32 of bearing 28 may engage throw 11 of crankshaft 16, while outer surface 30 may engage surfaces of connecting rods 14 (e.g., inner and outer lands 29, 31 of running surface 34 of blade rod 14*b*). Inner surface 32 of bearing 28 may include a center axis 37.

Outer surface 30 of bearing 28 may define two substantially identical and spaced apart outer lands 33, one inner land 35 disposed between outer lands 33, and peripheral lands 25 positioned adjacent to outer lands 33. Outer, inner, and peripheral lands 33, 35, 25 may have generally cylindrical shapes, although barrel shapes may also be utilized, if desired. Outer and inner lands 33, 35 of bearing 28 may correspond to outer and inner lands 29, 31 of running surface 34 of blade rod 14*b*, while peripheral lands 25 may correspond with tines 15 of fork rod 14*a*. Inner land 35 may have a width greater than approximately 50% of the width of outer surface 30 of bearing 28. Outer lands 33 may each have a width ranging between approximately 25-50% of the width of inner land 35. Outer and inner lands 33, 35 of bearing 28 may each have substantially identical curvatures of radius. Inner lands 31 and 35 may have widths that are substantially equal. Similarly, outer lands 29 and 33 may have widths that are substantially equal.

Like outer and inner lands 29, 31 of running surface 34 of blade rod 14*b*, outer and inner lands 33, 35 of bearing 28 may also be offset from each other. In particular, a centerline of radius —$C_3$— (i.e., a center axis) of outer lands 33 may be shifted a first direction along a parting line 43 of bearing 28 (referring to FIG. 5), while a centerline of radius —$C_4$— (i.e., a center axis) of inner land 35 may be shifted in an opposing second direction along parting line 43 of bearing 28. The offset 39 created by this shift may range between approximately 0.010-0.030 inches.

The location of outer lands 29, 33 and inner lands 31, 35 may correspond with a direction of maximum force transmission associated with the movement of blade rod 14*b*. In particular, the location of offsets 36, 39 between outer lands 29, 33 and inner lands 31, 35 may be understood by considering the working cycle of engine 10. As a two-cycle engine, engine 10 may include two distinct piston strokes that regularly occur in the same order. The first or intake/compression stroke may involve both an intake and compression process. When piston 12 is near bottom dead center (BDC), a position in which piston 12 has reached its nearest point to crankshaft 16, air may be drawn into cylinder 20 through ports in the wall of cylinder 20. Piston 12 may then move upward from BDC to top dead center (TDC), a position in which piston 12 has reached its furthest point from crankshaft 16. At TDC, the angle of rotation of crankshaft 16, or crank angle, is about 0°. As piston 12 moves upward toward TDC, piston 12 may compress the air, thereby heating it. This process may mark the completion of the first stroke. During this stroke, the force on piston 12 and blade rod 14*b* may be greatest when piston 12 is about 30-0° before top dead center (BTDC).

The second or power/exhaust/intake stroke may involve a combustion process, an exhaust process, and an intake process. As piston 12 nears TDC, fuel may be injected into combustion chamber 18. During the second stroke, piston 12 may move downward from TDC to BDC, At BDC, the crank angle is about 180°. The fuel may react with the heated air and ignite, forcing piston 12 downward. As piston 12 nears BDC, an outlet may open and exhaust gases may be released. Afterward, ports in the wall of cylinder 20 may open to allow intake air to enter. During combustion, piston 12 may generally transfer force from the expanding gas in cylinders 20 to crankshaft 16. In this manner, crankshaft 16 may convert the reciprocating linear motion of piston 12 into rotational motion. The force on piston 12 and blade rod 14b during the second stroke may be greatest when piston 12 is about 0-70° after top dead center (ATDC), and peak at about 10° ATDC.

Figure 6:
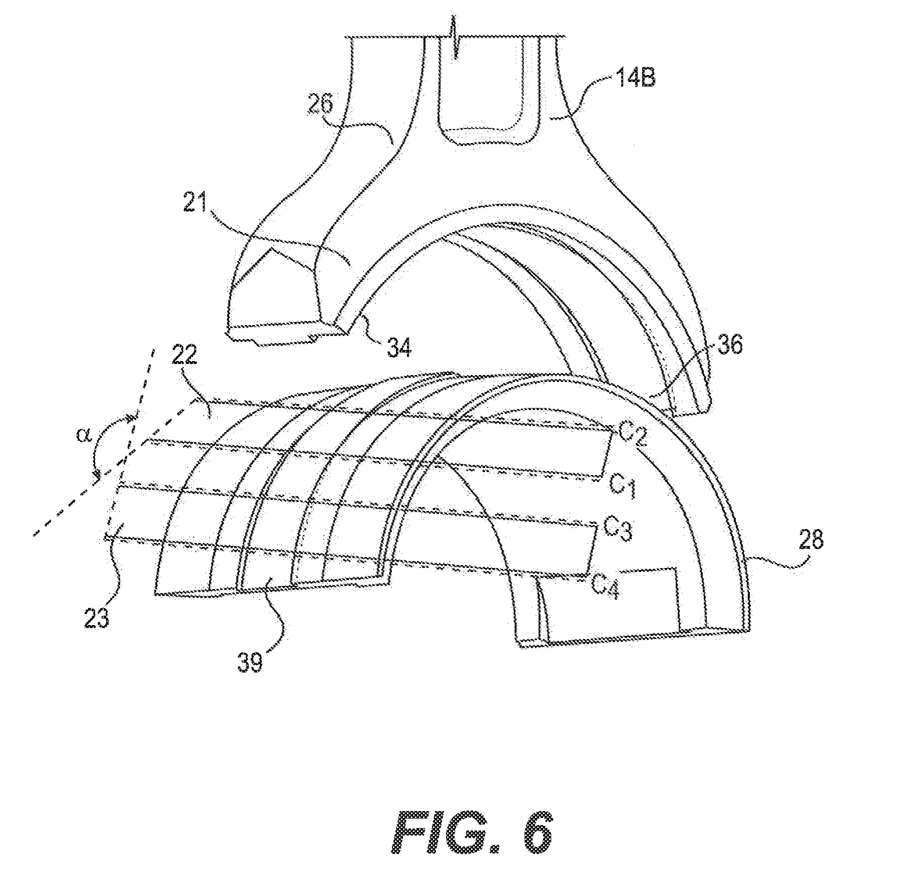
FIG. 6 is a pictorial illustration of a connecting rod of FIG. 2 and the bearing of FIG. 4.

As shown in FIG. 6, two planes may be envisioned during the working cycle of engine 10 to describe the interaction between offsets 39 of bearing 28 and 36 of blade rod 14b. In particular, a first plane 22 corresponding to the offset 36 in blade rod 14b may be understood to contain the center axis —$C_1$— and —$C_2$— of outer and inner lands 29, 31. A second plane 23 corresponding to the offset 39 in bearing 28 may be understood to contain the center axis —$C_3$— and —$C_4$— of outer and inner lands 33, 35. An offset angle α may exist at the intersection of first plane 22 and second plane 23. Because the offset angle α may vary during different parts of the strokes (due to the relative rotation between blade rod 14b and bearing 28), the offset angle α may be described in terms of the crank angle, an approach that is adopted below.

The offsets 36, 39 between outer lands 29, 33 and inner lands 31, 35 may be selected to provide the most support to blade rod 14b when the greatest force is being exerted on blade rod 14b by piston 12. In particular, at a crank angle of approximately 67.5° BTDC, which may generally coincide with the start of the compression process of the first stroke, the load of piston 12 may be supported most directly by both inner lands 31, 35 and outer lands 29, 33. At this point, the offset angle α may be oriented at approximately 0° (i.e., first plane 22 and second plane 23 may be generally aligned). As engine 10 proceeds toward the second stroke, support for the load of piston 12 may shift to only inner lands 31, 35. At a crank angle of approximately 22.5° ATDC, the offset angle α may be oriented at approximately 10.5°. As engine 10 proceeds through the second stroke, the offset angle α may decrease until the crank angle reaches approximately 112.5° ATDC. At a crank angle of approximately 112.5° ATDC, the offset angle α may return to approximately 0° and support for the load of piston 12 may shift again such that the load may again be supported most directly by inner lands 31, 35 and outer lands 29, 33. Between a crank angle of approximately 112.5° ATDC and 67.5° BTDC, support for the load of piston 12 may shift such that the load may be supported by only outer lands 29, 33.

As the crank angle progresses through the compression process of the first stroke toward the combustion process of the second stroke, the highest loading may occur between a crank angle of approximately 30° BTDC and approximately 70° ATDC. The maximum force transmission may peak at a crank angle of approximately 10° ATDC. At a crank angle of approximately 10° ATDC, the offset angle α may be approximately 10.4°. In this manner, bearing 28 may support the highest load while blade rod 14b is situated near an end of its angular travel.

As blade rod 14b pivots relative to bearing 28, the load may transition from inner lands 31, 35 to outer lands 29, 33 and vice versa. In particular, outer lands 29, 33 may engage each other to support the load of piston 12, at which point inner lands 31, 35 may be away from each other. As inner lands 31, 35 are forced away from each other, the divergence may draw oil into the resulting clearance volume and generate a film that supports high loads occurring during the subsequent cycle of engine 10. Similarly, as inner lands 31, 35 engage to support the load of piston 12, outer lands 29, 33 may be forced away from each other to create a divergence that draws oil into the resulting clearance volume, thereby generating an oil film that supports high loads that occur during the subsequent cycle of engine 10. At a crank angle of approximately 10° ATDC, both inner lands 31, 35 and outer lands 29, 33 may engage to support the load of piston 12. Some lubrication may remain during simultaneous engagement of inner lands 31, 35 and outer lands 29, 33.

In addition to the offset design of the present disclosure, bearing 28 may include additional features that facilitate lubrication. In particular, as crankshaft 16 begins to turn, oil from a high-pressure pump (not shown) may be pumped axially into crankshaft 16 and radially outward through bearing 28 via one or more passages 44 (referring to FIGS. 4 and 5). This arrangement may help to maintain lubrication at the interface between outer surface 30 of bearing 28 and running surface 34 of second end 26 of blade rod 14b.

Passages 44 may be further defined by annular grooves 42 (referring to FIG. 4) for carrying return oil (referring to FIG. 4), if desired. Grooves 42 may be formed within outer surface 30 (and/or inner surface 32) of bearing 28, between outer and inner lands 33, 35. A plurality of smaller grooves (not shown) may be defined in outer surface 30 of bearing 28 and may be interconnected with grooves 42 defined between outer and inner lands 33, 35 of bearing 28. For example, the smaller grooves may interconnect perpendicularly to grooves 42 defined between outer and inner lands 33, 35. Oil leaving grooves 42 may spread laterally to provide lubrication at the interface between outer surface 30 of bearing 28 and running surface 34 of second end 26 of blade rod 14b.

INDUSTRIAL APPLICABILITY

The objective of engine lubrication may include the alleviation of friction to thereby reduce heating and wear of the working parts of engine 10. Maintaining sufficient oil lubrication at the interface between blade rod 14b and bearing 28 may be necessary to support the load exerted by piston 12. This oil lubrication may help to prevent contact from occurring between blade rod 14b and bearing 28, which can reduce the durability, reliability, and efficiency of engine 10.

Lubrication of engine 10 may be accomplished, at least in part, by employing a hydrodynamic film of lubricating oil between the surfaces of bearing 28 and blade rod 14b. During hydrodynamic lubrication of bearing 28, a wedge-like film of a may be generated between the load-carrying surfaces of bearing 28 and blade rod 14b. This arrangement may function to separate the load-carrying surfaces of bearing 28.

Offset bearings may generally be used to enhance film lubrication conditions by dividing a bearing axially into cylindrical segments with offset centerlines. This arrangement may permit load sharing between segments of the hearing, which may periodically relieve the load carried by each segment. Lubrication may occur during these periods of relief.

The piston assembly having the offset bearing of the present disclosure may provide the greatest support under the highest loads of piston 12, while still ensuring sufficient lubrication. In particular, lubrication at the interface between second end 26 of blade rod 14b and bearing 28 may be provided by generating an oil film on inner lands 31, 35 during each cycle of engine 10. Inner lands 31, 35 may be optimized to support the highest loads occurring while blade rod 14b is situated near an end of angular travel, and to provide the highest level of lubrication between high loading situations.

As engine 10 progresses through its working cycle, the oscillatory motion of crankshaft 16 at the interface between blade rod 14b and bearing 28 may transfer the load of piston 12 between outer lands 29, 33 and inner lands 31, 35. For example, as second end 26 of blade rod 14b rocks toward inner lands 31, 35, outer land 29 of running surface 34 of second end 26 of blade rod 14b may be forced away from the complementary outer surface 30 of bearing 28. This divergence may increase the volume defined by outer lands 29, 33 and draw oil into this volume. As blade rod 14b rocks back toward outer lands 29, 33, running surface 34 of blade rod 14b may ride on the oil film generated on outer lands 29, 33.

Similarly, as blade rod 14b rocks toward outer lands 29, 33, inner land 31 of running surface 34 of second end of blade rod 14b may be forced away from the complementary outer surface 30 of bearing 28. This divergence may increase the volume defined by inner lands 31, 35 and draw oil into this volume. As blade rod 14b rocks back toward inner lands 31, 35, running surface 34 of second end 26 of blade rod 14b may ride on the oil film generated on inner lands 31, 35.

Additionally, benefits may be realized by the piston assembly having offset bearing of the present disclosure. In particular, because an uninterrupted bearing surface may be able to support a greater load than a grooved bearing surface of comparable size, the disclosed piston assembly may have increased load bearing capability due to a reduced network of grooves.

It will be apparent to those skilled in the art that various modifications and variations can be made to the disclosed piston assembly without departing from the scope of the disclosure. Other embodiments of the piston assembly will be apparent to those skilled in the art from consideration of the specification and practice of the piston assembly disclosed herein. It is intended that the specification and examples be considered as exemplary only, with a true scope of the disclosure being indicated by the following claims and their equivalents.

What is claimed is:

1. A piston assembly, comprising:
    a first piston crown;
    a first connecting rod having a first end pivotally connected to the first piston crown and a second end with a circular opening configured to receive a throw of a crankshaft;
    a second piston crown;
    a second connecting rod having a first end pivotally connected to the second piston crown and a second end with a circular opening configured to receive the throw of the crankshaft, the second connecting rod having a running surface defining at least two outer lands and at least one inner land disposed between the at least two outer lands that alternately support a load of the second piston crown during a combustion process, the at least two outer lands having a center axis radially offset from a center axis of the at least one inner land, and wherein a radial offset between the center axis of the at least two outer lands and the center axis of the at least one inner land is between approximately 0.010-0.030 inches; and
    a bearing disposed within the circular openings of the first and second connecting rods between the second ends of the first and second connecting rods and the throw of the crankshaft, wherein both the inner and outer lands simultaneously support the load of the second piston crown against the bearing at a point of highest load on the second piston crown during the combustion process.

2. The piston assembly of claim 1, wherein the bearing includes at least two outer lands and at least one inner land disposed between the at least two outer lands of the bearing, the at least two outer lands of the bearing having a center axis radially offset from a center axis of the at least one inner land of the bearing.

3. The piston assembly of claim 2, wherein a radial offset between the center axis of the at least two outer lands of the bearing and the center axis of the at least one inner land of the bearing is between approximately 0.010-0.030 inches.

4. The piston assembly of claim 2, further including
    a first plane containing the center axis of the at least two outer lands and the at least one inner land of the second connecting rod; and
    a second plane containing the center axis of the at least two outer lands and the at least one inner land of the bearing, wherein an offset angle at an intersection of the first plane and the second plane is approximately 0° at a crank angle of approximately 67.5° BTDC and 112.5° ATDC.

5. The piston assembly of claim 4, wherein the offset angle is approximately 10.5° at a crank angle of approximately 22.5° ATDC.

6. The piston assembly of claim 5, wherein the highest load of the second piston crown peaks between a crank angle of approximately 30° BTDC-70° ATDC.

7. The piston assembly of claim 6, wherein the highest load of the second piston crown peaks at a crank angle of approximately 10° BTDC when the offset angle is approximately 10.4°.

8. The piston assembly of claim 2, wherein the at least two outer lands of the second connecting rod are substantially identical to each other and the at least two outer lands of the bearing are substantially identical to each other.

9. The piston assembly of claim 2, wherein the at least two outer lands of the second connecting rod, the at least one inner land of the second connecting rod, the at least two outer lands of the bearing, and the at least one inner land of the bearing are cylindrical.

10. The piston assembly of claim 1, wherein the at least one inner land of the second connecting rod has a width greater than approximately 50% of a width of the running surface of the second connecting rod.

11. The piston assembly of claim 10, wherein the at least two outer lands of the second connecting rod have widths between approximately 25-50% of the at least one inner land of the second connecting rod.

12. The piston assembly of claim 2, wherein the at least one inner land of the bearing has a width greater than approximately 50% of a width of an outer surface of the bearing.

13. The piston assembly of claim 12, wherein the at least two outer lands of the bearing have widths between approximately 25-50% of the at least one inner land of the bearing.

14. The piston assembly of claim 1, wherein the bearing includes a plurality of annular grooves for carrying oil.

15. The piston assembly of claim 1, wherein
    the second end of the first connecting rod includes tines; and
    the second end of the second connecting rod includes a blade inter-leaved with the tines of the first connecting rod.

16. The piston assembly of claim 1, wherein
    the first connecting rod includes a cap; and
    a plurality of dowel pins connecting the cap and first connecting rod to the bearing.

17. The piston assembly of claim 16, wherein the second connecting rod is held to the bearing by the first connecting rod and the second connecting rod rotates relative to the bearing and the first connecting rod.

18. An engine, comprising:
    an engine block at least partially defining a plurality of cylinders;
    a crankshaft rotatably disposed within the engine block;

a first piston crown disposed within a first of the plurality of cylinders;

a first connecting rod having a first end pivotally connected to the first piston crown and a second end with a circular opening configured to receive a throw of the crankshaft;

a second piston crown disposed within a second of the plurality of cylinders;

a second connecting rod having a first end pivotally connected to the second piston crown and a second end disposed within tines of the first connecting rod and with a circular opening configured to receive the throw of the crankshaft, the second connecting rod having a running surface defining at least two outer lands and at least one inner land disposed between the at least two outer lands that alternately support a load of the second piston crown during a combustion process, the at least two outer lands having a center axis radially offset from a center axis of the at least one inner land, and wherein a radial offset between the center axis of the at least two outer lands and the center axis of the at least one inner land is between approximately 0.010-0.030 inches; and a bearing disposed within the circular openings of the first and second connecting rods between the second ends of the first and second connecting rods and the throw of the crankshaft, wherein both the inner and outer lands simultaneously support the load of the second piston crown against the bearing at a point of highest load on the second piston crown during the combustion process.

* * * * *

UNITED STATES PATENT AND TRADEMARK OFFICE
CERTIFICATE OF CORRECTION

| | | |
|---|---|---|
| PATENT NO. | : 8,752,523 B2 | Page 1 of 1 |
| APPLICATION NO. | : 13/459586 | |
| DATED | : June 17, 2014 | |
| INVENTOR(S) | : Aaron G. Foege | |

It is certified that error appears in the above-identified patent and that said Letters Patent is hereby corrected as shown below:

In the Specification

Column 4, line 63, delete "BDC," and insert -- BDC. --.

Column 6, line 44, delete "a may" and insert -- oil may --.

Column 6, lines 50-51, delete "hearing," and insert -- bearing, --.

Signed and Sealed this
Fifteenth Day of September, 2015

Michelle K. Lee
*Director of the United States Patent and Trademark Office*